July 9, 1929.  F. ROKITA  1,720,402
WIND MOTOR
Filed Nov. 28, 1924  6 Sheets-Sheet 2

Fig. 2.

INVENTOR
*Frank Rokita*

WITNESSES
L. Goodman
E. N. Lovewell

BY

ATTORNEY

July 9, 1929.  F. ROKITA  1,720,402
WIND MOTOR
Filed Nov. 28, 1924  6 Sheets-Sheet 3

WITNESSES
Louis Goodman
E. N. Lovewell

INVENTOR
Frank Rokita
BY 
ATTORNEY

July 9, 1929.　　　　F. ROKITA　　　　1,720,402

WIND MOTOR

Filed Nov. 28, 1924　　6 Sheets-Sheet 4

WITNESSES
L. Goodman
E. N. Lovewell

INVENTOR
Frank Rokita
BY
ATTORNEY

July 9, 1929.  F. ROKITA  1,720,402
WIND MOTOR
Filed Nov. 28, 1924  6 Sheets-Sheet 5

WITNESSES
L. Goodman
E. N. Lovewell

INVENTOR
Frank Rokita
BY
ATTORNEY

July 9, 1929.  F. ROKITA  1,720,402
WIND MOTOR
Filed Nov. 28, 1924   6 Sheets-Sheet 6

WITNESSES
L. Goodman
E. N. Lovewell

INVENTOR
Frank Rokita
BY
ATTORNEY

Patented July 9, 1929.

1,720,402

UNITED STATES PATENT OFFICE.

FRANK ROKITA, OF ELLOAM, MONTANA.

WIND MOTOR.

Application filed November 28, 1924. Serial No. 752,671.

This invention relates to a wind motor adapted to be used for generating electric power, or for transmitting power directly to a pump or other mechanism.

The primary object of the invention is to provide a wind motor of practical construction, which can be depended upon to supply power uniformly and constantly, while the velocity of the wind varies between wide limits, and which is especially suited for the operation of power plants of large capacity.

The invention includes, among its more important features, a wind wheel mounted on a turntable which is revolubly supported, and which also carries a dynamo for generating electric power, roller contacts being provided through which the generated current is conducted to the main service wire. Mechanical means are also provided for taking power directly from the wind wheel shaft to operate a pump or any machinery which is to be driven.

Another important feature includes the provision of a wind wheel having vanes with sails mounted thereon, which are automatically reefed or unreefed, following variations in wind velocity. In addition to a governor which regulates the area of the sails substantially in inverse proportion to the wind velocity, there is a second governor which, through the medium of a small storage battery, furls the sails entirely when the wind ceases altogether, and also field governors located at outlying points, and adapted to be actuated upon the approach of a sudden gale of unusual violence, such as a thunder storm or tornado, to completely furl the sails before it reaches them.

The invention consists further in various details of construction and combinations of elements, the advantages of which will be hereinafter explained in connection with the accompanying drawings, which illustrate one practical embodiment of the invention.

The embodiment of the invention, which is shown in the accompanying drawings, comprises a tower 1 made, in the present instance, of concrete, and having at its upper end a circular track 2, which is channel-shaped in cross-section and revolubly supports an annular bearing ring 3, the inner sides of the track having flanges 4 extending into grooves 5 in the sides of the ring to hold the latter upon the track. The ring 3 carries upstanding bearing members 6, which rotatably support a comparatively large wind wheel shaft 7. The shaft 7 is hollow with a spider 8 secured to one end and a large drum 9 secured to the other end, and provided with means hereinafter described for driving an electric power generator. A beveled gear 10 is secured to the shaft 7 between the bearings 6, and meshes with a beveled gear 11 secured to the upper end of a shaft 12, which extends downwardly centrally of the tower, and may be connected at its lower end to a pump, or other machinery, which is to be directly driven.

The spider 8 is provided with four or more radially projecting hollow arms 13 which support hollow shafts 14, the inner ends of these shafts being threaded into the main power shaft 7. Each of the shafts 14 has a vane 15 secured to its outer end, the outer end of the vane being connected by a guy rod 16 to a flange 17 formed on the front end of the spider 8, each guy rod being provided with a turnbuckle 18. Each of the vanes 15 comprises a skeleton frame with end bars 19, the ends of which are connected by channel bars 20, constituting the side edges of the vane. A brace bar 21 connects the middle points of the channel bars 20, and the end bars 19 are connected at their middle points by a flat brace bar 22 and the trough-shaped bar 23, the edges of which are spaced from the edges of the bar 22 sufficiently to receive the sails 24. A shaft 25 is mounted for rotation within the hollow shaft 14 and extends throughout the length of the vane 15, and has a roller 26 secured thereon to which the sails 24 are attached. The outer edges of each sail 24 have cords 27 attached thereto, which are adapted to be wound about rollers 28 mounted within the channel bars 20, and each enclosing a coiled spring 29, which is so tensioned as to normally rotate the roller in a direction to wind up the cords 27, and to stretch the sails across the spaces between the bars 22 and 20. The shafts 25, however, and the rollers 26 secured thereto are adapted to be rotated by means hereinafter described to partially wind up the sails in opposition to the springs 29, so as to maintain the amount of spread substantially in inverse proportion to the velocity of the wind. Under certain conditions also the shaft 25 is rotated sufficiently to entirely furl the sails, and to maintain them in this condition until the said conditions have ceased.

The rotation of the shafts 25 is controlled through the medium of a hollow shaft 30 journaled in blocks 31 and 32 within the main power shaft 7, and provided with a beveled gear 33 in mesh with beveled pinions 34, secured to the inner ends of the respective shafts 25. The front end of the hollow shaft 30 projects beyond the end of the shaft 7, and has a spider 35 secured thereto, in which are mounted shafts 36 having comparatively small vanes 37 secured thereto. The spider 35 and vanes 37 constitute a governor which normally acts on the shaft 30 to partially rotate the same independently of the shaft 7, so as to rotate the rollers 26 to partially reef the sails. As the wind velocity increases, more power is developed, and the shafts 25 are further rotated to reduce the spread of the sails in opposition to the action of the springs 29. As the wind velocity decreases, less power is developed by the governor, and the action of the springs 29 draws the sails outwardly again increasing their spread. The vanes 37 may be adjusted outwardly or inwardly on the shafts 36, so that the desired spread of sails will be obtained for a given velocity.

Provision is also made for furling the sails entirely under certain conditions. For this purpose a gear wheel 38 is secured on the shaft 30 within the drum 9, and is adapted, under predetermined conditions, to be positively driven by a pinion 39, which is secured directly to the shaft of a small motor 40 mounted upon a support 41 secured within the drum. The means for actuating the motor 40, and the conditions under which it is actuated to furl the sails will be more fully explained hereinafter.

The front end of the drum 9 is secured to the power shaft 7, and the rear end 42 forms a bearing for the rear end of the shaft 30, which extends rearwardly from the drum 9 to a bearing 43 supported at the upper ends of brace bars 44. These brace bars extend downwardly and inwardly toward the tower 1, and carry rollers 46 at their lower ends which are adapted to ride in a circular track 47 about the tower 1 as the direction of the wind shifts. The lower ends of the brace bars 44 are connected by transverse braces 45, which are connected to upright braces 48, having at their upper ends a bearing on the shaft 7. Supported between the braces 44 and 48 are horizontal bars 49 forming a support for a platform 50 on which are mounted a small battery 51 and a generator 52, the latter being driven directly from the drum 9 by a belt 53. The poles of the generator 52 are connected by wires 54 to binding posts 55, secured on a bracket 66 which extends downwardly from the bars 45. The binding posts 55 are connected through roller contacts 56 with circular tracks 57 supported on the tower 1 and insulated therefrom, and from these tracks wires 58 lead to a storage battery and to the distributing system.

Figures 11, 12:
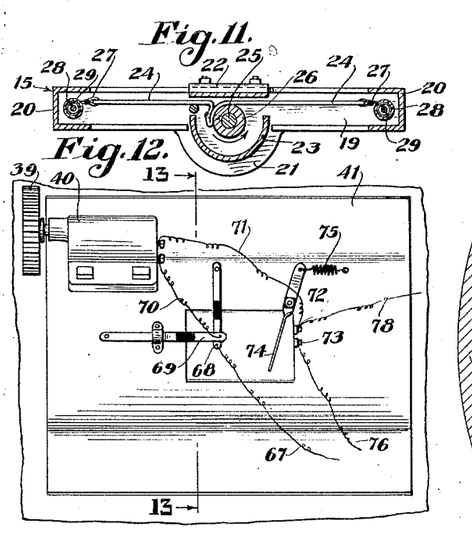
Figure 11 is a section taken on the line 11—11 of Figure 8.
Figure 12 is a fragmentary view showing a portion of the interior of the drum on the power shaft.
Figure 13:
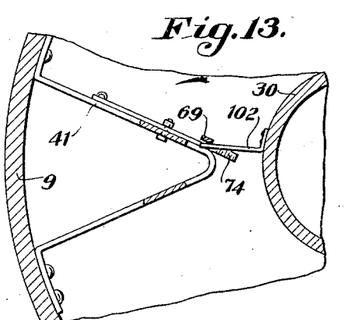
Figure 13 is a fragmentary sectional view taken on the line 13—13 of Figure 12.
Figure 14:
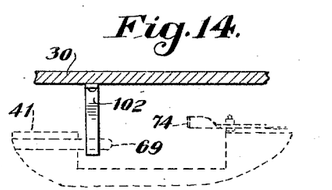
Figure 14 is a fragmentary view showing means for interrupting the current to the small motor which furls the sails.
Figure 15:
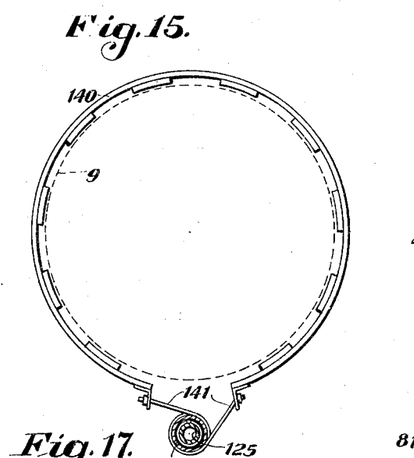
Figure 15 is a detail view of a brake band for locking the power shaft.
Figure 16:
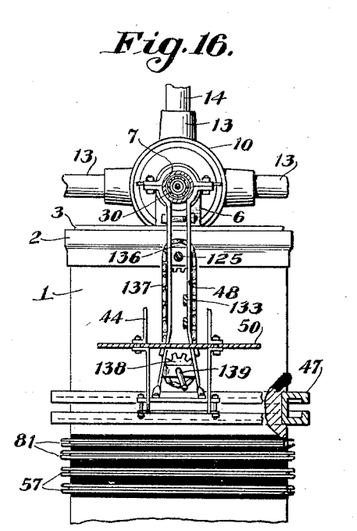
Figure 16 is a section taken substantially on the line 16—16 of Figure 2.

The small battery 51 is utilized occasionally for operating the small motor 40 to furl the sails. Since the motor 40 is carried around with the drum 9 as the latter rotates, roller contacts must be provided in the circuit between the battery 51 and said motor. A bracket 59, therefore, is secured to the housing of the generator 52, or to any other point which is stationary with respect to the platform 50. This bracket 59 is provided with three binding posts 60, 61 and 62, which are connected by roller contacts with concentric insulated tracks 63, 64 and 65 respectively, mounted on the end 42 of the drum 9. The positive pole of the battery 51 has a wire 66 leading to one of the binding posts, as 60, and the circuit continues through the track 63 and wire 67 to a binding post 68 mounted on the support 41. A spring 69, connected by a wire 70 to the positive pole of the motor 40, is normally in contact with the binding post 68, but is adapted to be disconnected therefrom under certain conditions as will be hereinafter explained. The return part of the circuit continues from the negative pole of the motor 40 through the wire 71 to a contact member 72, which is located in proximity to the contact member 73, but normally disconnected therefrom. The contact members 72 and 73, however, are adapted to be bridged by a switch blade 74, which is intermediately fulcrumed on the support 41, and normally held open by a spring 75, as shown in Figure 12. The contact member 73 is connected by a wire 76 through the ring 64, binding post 61 and wire 77 to the negative pole of the battery 51. It will be noted, therefore, that with the spring blade 69 in its normally closed position, the motor 40 will be started whenever the switch 74 is closed.

Figures 1, 20, 21:
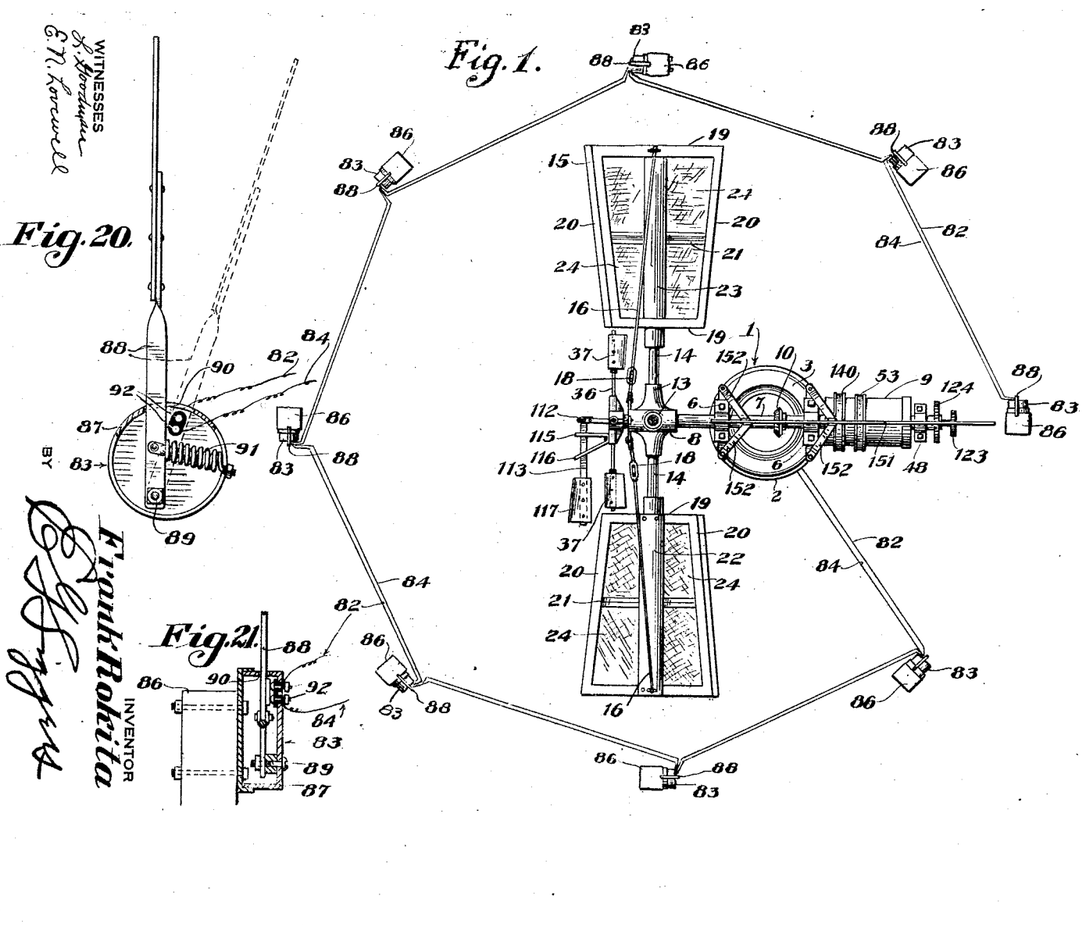
Figure 1 is a plan view of the invention.
Figure 20 is a detail view of one of the field governors.
Figure 21 is a sectional view taken at right angles to Figure 20.
Figure 2:
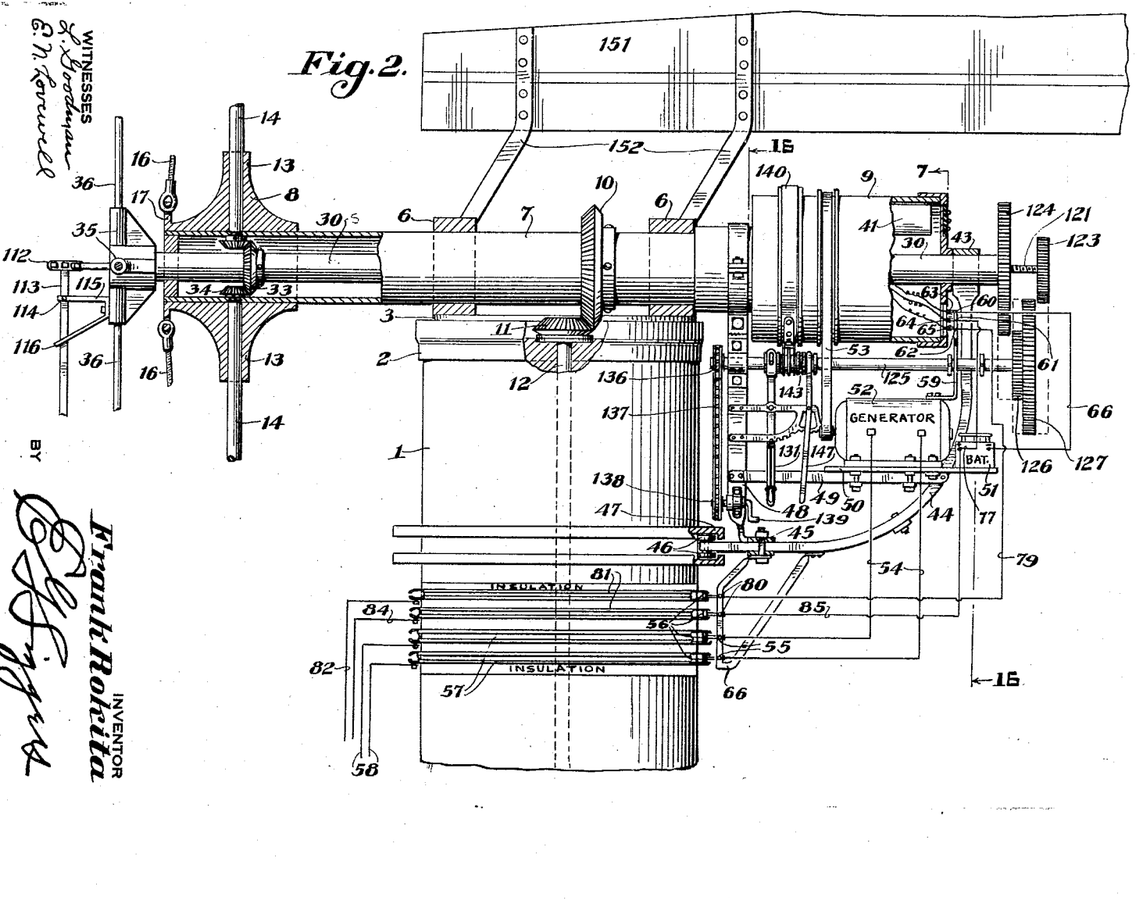
Figure 2 is a side elevation of a portion of the invention, with a part of the wind wheel shaft shown in section.

A second return line to the battery 51 comprises a wire 78 leading from the contact member 72, through the ring 65, binding post 62 and wire 79 to one of the binding posts 80 secured to the bracket 56, and having a roller contact with one of the rings 81 supported by the tower 1. The circuit continues thence through a wire 82 to one of the field governors 83, Figures 1, 20 and 21, thence through a wire 84, and the other ring 81 and binding post 80, and through a wire 85 to the negative pole of the battery 51.

A number of field governors 83 are arranged at outlying points surrounding the tower 1, and are all connected in electrically parallel relation to the wires 82 and 84. Each field governor 83 is supported by a post 86, and comprises a cylindrical casing 87 within which a vane 88 is mounted upon a pivot 89, and projects upwardly through a slot 90 in the casing. The vane is normally held by a coiled spring 91, in the position shown in full lines in Figure 20, but when it is struck by a wind of such violence that it might cause damage to the wind mill, the vane is moved against the resistance of the spring 91 to the position shown in dotted lines in Figure 20, where it bridges the contacts 92 to which the wires 82 and 84 are connected. The vanes 88 are arranged so that their normal position is in a vertical plane tangent to a circle drawn about the tower as a center. The distance of the governors 83 from the tower is preferably one hundred and fifty feet or more, so that when a sudden gust of wind strikes the field governor, there will be sufficient time for the sails to be furled before the wind reaches the vanes 15.

When a wind of sufficient violence strikes one of the vanes 88 to bridge the contacts 92, a circuit is established as above described from the battery 51, through the small motor 40. This motor then, through the pinion 39 and gear 38, rotates the shaft 30, and thereby rotates the rollers 26 until the sails are completely furled. The ratio between the gears 33 and 34 is such that one complete revolution of the shaft 30 and gear 38 with respect to the shaft 7 completes the furling of the sails.

Figures 3, 7:
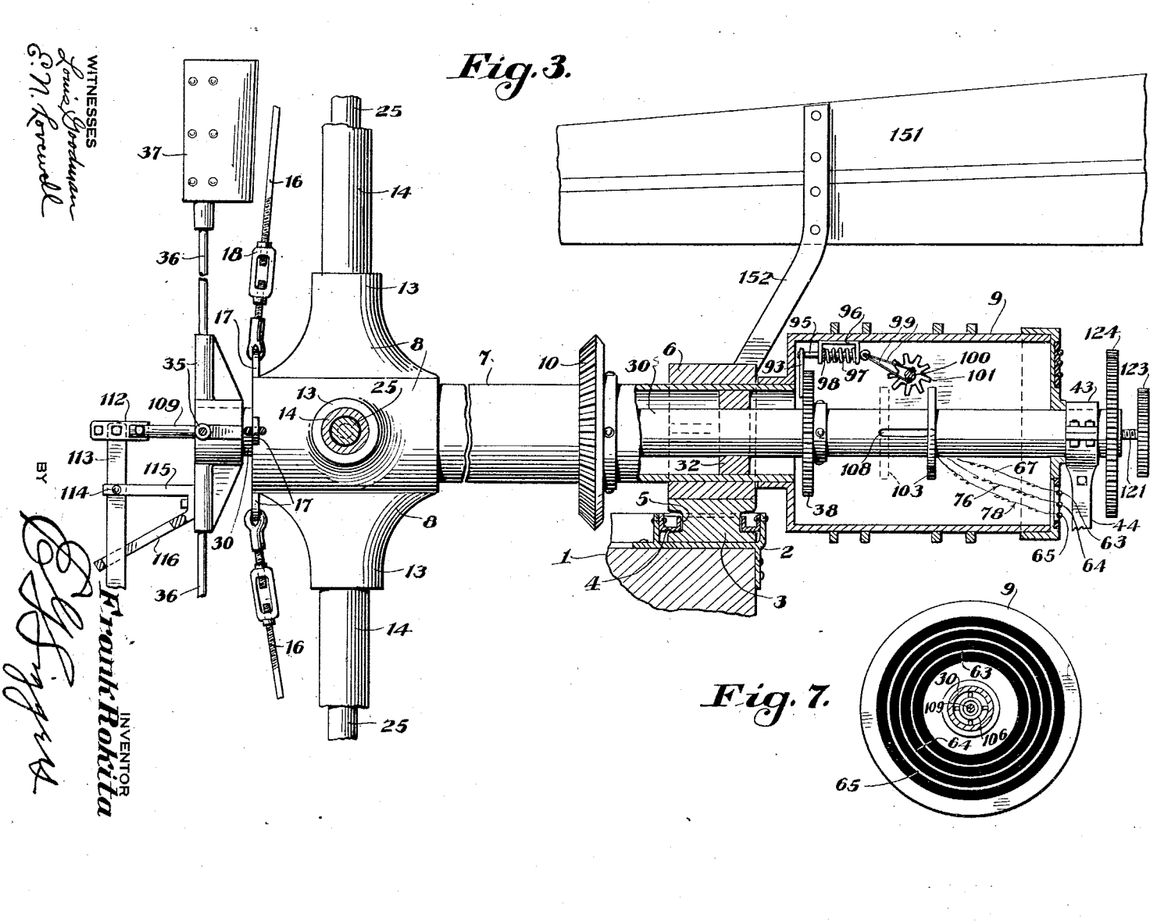
Figure 3 is a vertical sectional view illustrating certain mechanism for controlling the position of the sails.
Figure 7 is a section taken on the line 7—7 of Figure 2.
Figure 6:
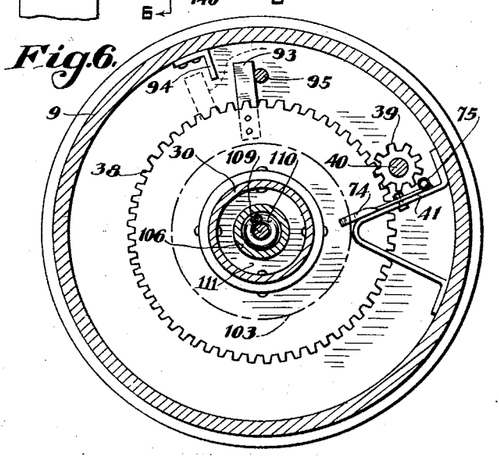
Figure 6 is a section taken on the line 6—6 of Figure 4.
Figure 8:
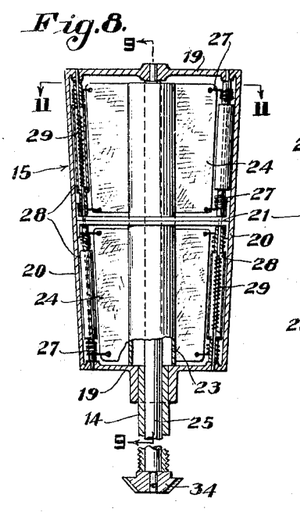
Figure 8 is a section taken centrally through one of the vanes.
Figure 9:
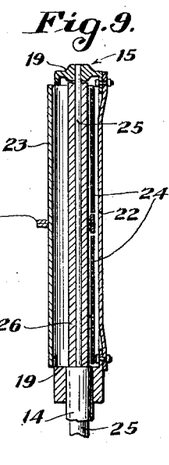
Figure 9 is a section taken on the line 9—9 of Figure 8.
Figure 10:
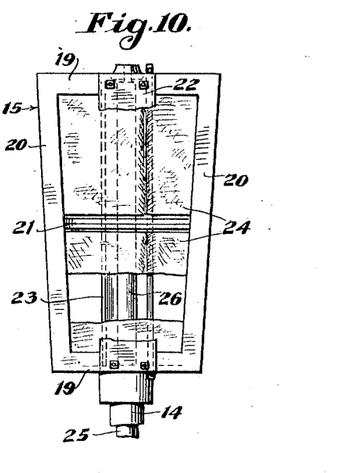
Figure 10 is a front elevation of one of the vanes with parts broken away.

A finger 93 projects radially from the gear 38, and when the sails are completely spread this finger rests against a cushioned abutment 94, as shown in dotted lines in Figure 6. When the gear 38 is rotated to furl the sails, the finger 93 is moved past a latch member 95 to the position shown in full lines in Figure 6. The latch member is slidably mounted in a bracket 96, as shown in Figure 3, and held normally projected by means of a coiled spring 97, which engages projections 98 on the latch. The latch is provided with a beveled end over which the finger 93 rides, and which positively prevents the return movement of the finger and the unfurling of the sails until the latch is withdrawn. For the purpose of withdrawing the latch when conditions warrant it, the rear end of the latch is connected by cords 99 to opposite sides of a shaft 100, rotatably mounted transversely of the drum. A toothed wheel 101 is secured to the shaft 100, and adapted to be engaged by a ring 103 which encircles the shaft 30, and is slidable longitudinally thereof. The ring 103 is supported by spokes 104, which are secured to and project radially from a cylindrical block 105 slidably mounted within a hollow shaft 106, which in turn is slidably mounted within the hollow shaft 30. The spokes 104 project through longitudinal slots 107 and 108 formed in the shafts 106 and 30, respectively, in which the spokes are slidable as the block 105 is moved longitudinally in accordance with varying wind velocities. A rod 109 is mounted within the shaft 106 with its rear end secured in the block 105, and a coiled spring 110 surrounding the rod 109 bears at one end against the block 105, and bears at the other end against a collar 111, which is secured to the shaft 106 and slidably receives the rod 109. When uninfluenced by outside conditions, therefore, the spring 110 normally holds the block 105 and the ring 103 in their rearmost position. The forward end of the rod 109 extends beyond the governor 35, and is connected by a link 112 to the inner end of a lever 113, which is fulcrumed at 114 in a bracket 115 secured to the governor 35. The lever 113 extends through a slot 116 in the bracket 115 in which it is guided in its pivotal movement by the fulcrum 114. A vane 117 is secured to the outer end of the lever 113 and constitutes an auxiliary governor, the operation of which will now be explained.

Figure 4:
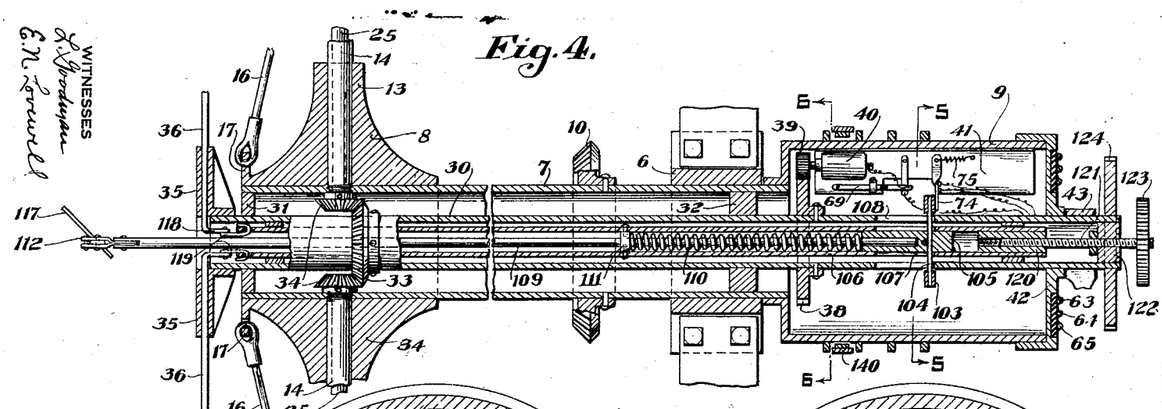
Figure 4 is a horizontal section through the wind wheel shaft.
Figure 5:
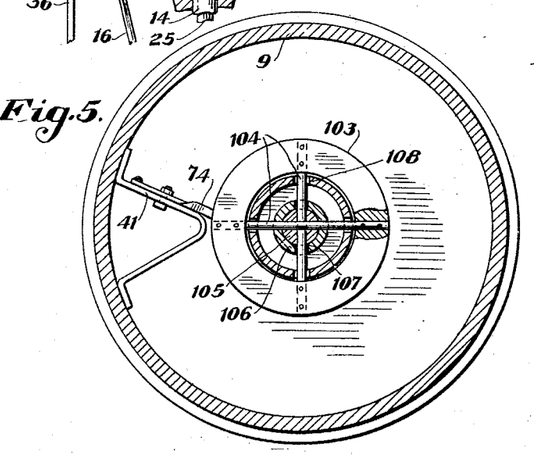
Figure 5 is a section taken on the line 5—5 of Figure 4.

When there is a dead calm, the vane 117 will hang downwardly with the lever 113 in vertical position, and the rod 109, block 105 and ring 103 will be moved to their rearmost position, as shown in Figure 4. In this position, the ring 103 engages the switch 74, bridging the contacts 72 and 73 and closing a circuit from the battery 51 through the wires 67, 70, 71 and 76 to the small motor 40 which furls the sails. This prevents any damage being done in case of a sudden whirlwind, which frequently occurs under such conditions. As soon as a moderate wind arises, however, and engages the vane 117, the lever 113 is rocked to move the ring 103 into contact with the toothed wheel 101, withdrawing the latch 95 and releasing the gear 38 and shaft, whereupon the sails are again spread under influence of the springs 29, the amount of spread now being regulated by the action of the governor 35. On the other hand, when the sails have been furled through the action of the field governors 83 upon the approach of an extremely violent wind, the ring 103 is carried to is extreme forward position, and upon the restoration of normal conditions the movement of the ring rearwardly into contact with the toothed wheel 101 will also withdraw the latch 95 and permit the sails to be spread.

The shafts 36 are rotatably mounted in the hub of the governer 35, and have at their inner ends laterally turned arms 118, which are connected by links 119 to the shaft 106. A longitudinal movement of the shaft 106, therefore will serve to rock the vanes 37 to vary their angle, and thereby vary the resultant force of the wind which regulates the amount of sail spread. For effecting this longitudinal adjustment of the shaft 106, a block 120 is secured in the rear end of the shaft, and is provided with a threaded bar which receives a screw journaled axially in a block 122, which is secured in the rear end of the shaft 30. A gear wheel 123, secured to the rear end of the screw 121, may be rotated manually by means hereinafter described to effect the adjustment of the shaft 106 and the angle of the vanes 37.

Figure 17:
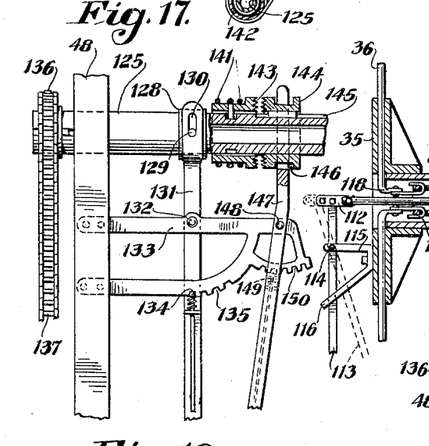
Figure 17 is a detail view of the shifting mechanism for connecting the controlling mechanism.
Figure 18:
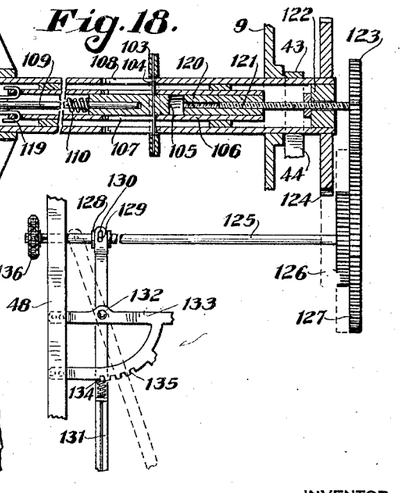
Figure 18 is a detail view illustrating the means for adjusting one of the governors.
Figure 19:
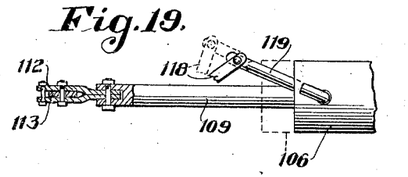
Figure 19 is an enlarged detail view of a portion of the mechanism shown in Figure 18.

A gear wheel 124 is secured to the rear end of the shaft 30, and may be rotated manually to furl the sails when it is desired to discontinue the operation of the windmill altogether. The manually operated means for driving the gear wheels 123 or 124 comprises a shaft 125 rotatably supported on the braces 44 and 48, and having a limited longitudinal adjustment for bringing the gear wheels 126 and 127, secured on the shaft 125, into mesh respectively with the gear 123 or 124. For effecting the longitudinal adjustment of the shaft 125, a collar 128 is rotatably mounted thereon, as shown in Figure 17, and is provided with pins 129 which engage slots 130 in the forked end of a lever 131, which is fulcrumed at 132 on a bracket 133 secured to the brace 48. A latch 134, carried by the lever 131, is adapted to engage between the teeth 135 to lock the shaft 125 in its adjusted position. A sprocket wheel 136 mounted on the inner end of the shaft 125 is connected by a sprocket chain 137 to a sprocket 138 mounted beneath the platform 50, and provided with a hand crank 139 by means of which the shaft 125 may be rotated to adjust the angle of the vanes 37, or to furl the sails, as the case may be.

It is desirable also to provide means for preventing the idle rotation of the shaft 7 and drum 9 when the windmill is not in use. For this purpose, I have provided a friction lock comprising a brake band 140 which encircles the drum 9, and has cords 141 connected to its ends and adapted to be wound about a sleeve 142, which is rotatably mounted on the shaft 125, and provided with clutch teeth 143 which are engageable by corresponding teeth on a clutch member 144, which is splined, as at 145, to the shaft 125. The clutch member 144 is provided with a peripheral groove 146 which is engaged by the forked end of a lever 147, the latter being fulcrumed at 148 on the projecting end of the bracket 133, and provided with a latch 149 adapted to engage with the teeth 150 to lock the lever 147 in adjusted position. By adjusting the clutch member 144, so that the sleeve 142 is clutched to the shaft 125, the latter may be rotated by means of the hand crank 139 to set the band 140, so as to entirely prevent rotation of the wind wheel shaft 7.

The operation of the invention will now be briefly summarized. A rudder 151 is supported by brackets 152 from the revolving ring 3, and functions in the usual manner to maintain the wind wheel shaft 7 in the direction of the wind. When there is a normal wind blowing, it strikes the vanes 15, which are secured at the proper angle for transmitting the maximum amount of power to the shaft 7. As the latter rotates, power is transmitted from the drum 9, through the belt 53 to the generator 52, from which the generator current is directed through wires 54 and 58 to a storage battery or to the line. If desired, however, the power may be transmitted from the shaft 7 through beveled gears 10 and 11, and the vertical shaft 12 to a dynamo or other machinery to be driven on the ground at the base of the tower.

The wind also exerts pressure against the vanes 37 of the governor, which is carried by the shaft 30 to rock the latter independently of the rotation of the shaft 7. As the wind velocity increases or diminishes, the power transmitted to the shaft 30, and thence through beveled gears 33 and 34 and shafts 25 to the rollers 26, correspondingly increases and diminishes, and the sails 24 are partially wound upon or unwound from the rollers 26. The power exerted by the shaft 30 is opposed by the tension of the springs 29, so that as the wind velocity decreases, the latter serve to unwind the sails 24 and present a greater area to the action of the wind. Thus, the area of the sails varies inversely to the wind velocity. In case, however, it is desired to increase or decrease the amount of sail spread for a given wind velocity, the inclination of the vanes 37 of the governor may be adjusted by moving the lever 131 to bring the gears 126 and 123 into mesh, and then by means of the hand crank 139 manually rotating the screw 121 to adjust the shaft 106 longitudinally, rocking the radial shafts 36 of the governor in either direction as desired.

In case a hurricane suddenly arises of such violence that there might be danger of injuring the wind motor, it first strikes one of the field governors 83 at a distance of one hundred and fifty feet or more from the tower and causes the vane 88 to bridge the contacts 82 and 84, thus establishing a circuit from the battery 51 through the wires 67, 70, 71 and 78 to the motor 40. The motor 40 through the gears 39 and 38 quickly rotates the shaft 30 through substantially one complete revolution, thus completely furling the sails in a moment's time. Toward the completion of this revolution, the finger 93 on the gear 38 passes the latch 95, and is automatically locked thereby against a reverse rotation, while the finger 102, projecting from the shaft 30, engages the spring contact member 69 and breaks the circuit. Meanwhile, the vane 117 of the auxiliary governor has moved the rod 109 forwardly, carrying the ring 103 toward the forward end of the drum 9. As the wind velocity diminishes, the vane 117 moves toward upright position, returning the rod 109 and the ring 103 rearwardly, while the ring engages the toothed wheel 101 and withdraws the latch 95, permitting the gear 38 and shaft 30 to be rotated in a reverse direction by the action of the springs 29, the force exerted upon the vanes of the governor 35 having also decreased along with the decrease in the wind velocity.

When the wind dies down so that there is a dead calm, the vane 117 moves to a vertical position shifting the rod 109 and the ring 103 to their rearmost position, the ring 103 then engaging the switch 74 and bridging the contacts 72 and 73, so that a circuit is completed from the battery through wires 67, 70, 71 and 76 to the motor 40 independently of the field governor 83. Under these conditions also the motor 40 acts to furl the sails completely, thus guarding against a sudden whirlwind of violent nature which often occurs under the conditions mentioned, and might otherwise damage the wind motor before the governor 35 would have time to act.

At night, or at other times when the power from the wind motor is no longer needed, the sails may be furled manually by the rotation of the shaft 30 through the medium of the gear 124. In effecting this operation, the shaft 125 is moved longitudinally through the medium of the lever 131 until the gear 127 is in mesh with the gear 124, whereupon the latter may be rotated by turning the hand crank 139. In order to positively lock the shaft 7 when the power is no longer needed, the brake band or friction lock 140 is provided, which may be set manually by the rotation of the hand crank 139 after the clutch teeth 143 have been thrown into engagement by the operation of the lever 147.

The invention is particularly adapted for use where a motor of large capacity is desired, since with the various governors and safety devices which are provided it is feasible to construct a wind wheel of large size from comparatively light and inexpensive material. In a light wind with the sails completely spread a maximum amount of power is obtainable, while with a heavy wind the same amount of power may be obtained with the sails partially furled without danger of damage to the motor.

While I have described the specific construction and the operation of the invention in considerable detail, it is to be understood that this is only for the purpose of illustrating one form in which the same may be embodied. It is obvious that many modifications may be made in the construction and arrangement of the tower, the wind wheel, power transmitting mechanism and governors without any material departure from the salient features of the invention. It is my intention, therefore, to include all such modifications within the scope of the appended claims.

What is claimed is:

1. In a wind motor, the combination of a hollow power shaft, a wind wheel secured to said shaft and having vanes thereon, radially disposed shafts carried by said wheel, means operable by the rotation of said radial shafts within the wheel to adjust said vanes, a governor shaft rotatably mounted within said power shaft and geared to the radial shafts, and a governor secured to said governor shaft and having comparatively small vanes secured thereto for actuating said radial shafts to adjust the vanes on the wind wheel, so as to drive the power shaft at substantially constant speed in spite of variations in wind velocity.

2. In a wind motor, the combination of a hollow power shaft, a wind wheel secured to said shaft and having vanes thereon, rollers mounted in said vanes and having sails attached thereto, resilient means tending to withdraw the sails from the rollers, a second shaft mounted within said power shaft and projecting therefrom, said second shaft being rotatable independently of the power shaft and operatively connected to said rollers, and a governor mounted on the front end of the second shaft to control its rotation in proportion to the velocity of the wind.

3. In a wind motor, the combination of a power shaft, a wind wheel secured thereon and having vanes, rollers mounted in said vanes and having sails attached thereto, a motor operatively connected to said rollers, a battery for driving said motor to furl the sails about said rollers, means for automatically completing a circuit from the battery through the motor when there is a dead calm, means for interrupting said circuit as soon as the sails are completely furled, and means for locking the gearing connected with the motor shaft against reverse rotation.

4. In a wind motor, the combination of a power shaft, a wind wheel secured thereon and having vanes in the form of skeleton frames, rollers mounted in said frames and having sails attached thereto, a motor connected by gearing with said rollers, said motor being supported by the power shaft to revolve therewith, a battery for driving said motor, means located at an outlying point for closing a circuit from the battery through the motor upon the approach of a violent gale, means for interrupting said circuit as soon as the sails are completely furled, and means for locking the gearing connected with the motor shaft against reverse rotation.

5. In a wind motor, the combination of a power shaft, a wind wheel secured to the power shaft and having vanes with sails supported thereon, a governor normally operable to maintain the amount of sail spread in inverse proportion to the wind velocity, manually operable means to adjust the governor to vary the normal sail spread for a given velocity, mechanism for completely furling sails, and means for actuating said mechanism when there is a dead calm.

6. In a wind motor, the combination of a main power shaft, a wind wheel secured to said shaft and having vanes with sails supported thereon, mechanism for completely furling said sails, means for automatically actuating said mechanism when there is a dead calm, and a manually operable friction band for locking the power shaft against rotation.

7. In a wind motor, the combination of a main power shaft, a wind wheel secured to said shaft and having vanes with sails supported thereon, mechanism for completely furling the sails, means located at an outlying point for actuating said mechanism upon the approach of a violent gale, and a manually operable friction band for locking the power shaft against rotation.

8. In a wind motor, the combination of a main power shaft, a wind wheel mounted on said shaft and having vanes with sails supported thereon, a governor normally operable to maintain the amount of sail spread in inverse proportion to the wind velocity, mechanism for completely furling the sails, means for actuating said mechanism when there is a dead calm, and a manually operable friction band for locking the power shaft against rotation.

9. In a wind motor, the combination of a main power shaft, a wind wheel mounted on said shaft and having vanes with sails supported thereon, a drum secured on said shaft, a generator driven from said drum, mechanism for completely furling the sails, and a manually operable friction band surrounding said drum for locking the same against rotation.

10. In a wind motor, the combination of a hollow power shaft, a wind wheel secured to said shaft and having vanes thereon, radially disposed shafts carried by said wheel, rollers mounted on said radial shafts and having sails attached thereto, resilient means tending to withdraw the sails from the rollers, a governor shaft rotatably mounted within said power shaft and geared to the radial shafts, and a governor secured to the governor shaft and having comparatively small vanes secured thereto and operable to rotate the governor shaft within the power shaft to partially wind the sails on the rollers in opposition to said resilient means, so that the amount of sail spread varies inversely with the velocity of the wind.

11. A wind motor comprising, in combination, a wind wheel having furling sails thereon; means for furling and unfurling said sails; and wind actuated remote control device for the furling and unfurling means located at such distance from said motor that the furling device will completely furl the sails upon the approach of a violent gale in the interval of time that elapses while the gale is traveling from the control device to the sails.

12. A wind motor comprising, in combination, a wind wheel having a plurality of furling sails thereon; mechanism for furling and unfurling said sails; electrical means for controlling the action of said mechanism; and outlying wind actuated vanes located in the field at a distance from said wind motor connected to close the electric circuit for said electrical means and thereby cause the sails to be completely furled upon the approach of a violent wind and in the interval of time that elapses while the gale is traveling from the governors to the sails.

13. A wind motor comprising, in combination, a wind wheel having a plurality of furling sails thereon, a motor connected to drive the furling mechanism for said sails;

a source of electrical energy for driving said motor; and wind actuated control means located at an outlying point connected to automatically close the circuit from the source of energy to the motor upon the approach of a violent wind, the distance between the control means and the sails being such that the sails will be furled completely during the time interval in which the wind travels from the control means to the sails.

In testimony, that I claim the foregoing as my own, I have hereto affixed my signature.

FRANK ROKITA.